US 8,037,146 B2

(12) United States Patent
Carr et al.

(10) Patent No.: US 8,037,146 B2
(45) Date of Patent: Oct. 11, 2011

(54) EMAIL ANNOTATION (75) Inventors: Hollie Carr, Southampton (GB);
Margaret A. Beynon, Woking (GB);
Gareth E. Jones, Winchester (GB);
Matthew R. Whitehead, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 12/246,618

(22) Filed: Oct. 7, 2008

(65) Prior Publication Data
US 2009/0125597 A1    May 14, 2009

(30) Foreign Application Priority Data
Nov. 13, 2007 (EP) .................................. 07120557

(51) Int. Cl.
*G06F 15/16* (2006.01)
*G06F 17/00* (2006.01)
(52) U.S. Cl. ........................ 709/206; 715/230
(58) Field of Classification Search .................. 709/206; 715/230
See application file for complete search history.

(56) References Cited

U.S. PATENT DOCUMENTS

2007/0239831 A1 * 10/2007 Basu ............................ 709/206
2010/0153503 A1 * 6/2010 Wolfe et al. .................. 709/206

OTHER PUBLICATIONS

Anonymous: "Selective Hidden Note Area(s), for any blind carbon copy(bcc:) Recipients and Nested Blind Carbon Copy" Research Disclosure, Mason Publications, Hampshire, GB, No. 452, Dec. 1, 2001, p. 2144, XP002236559 ISSN: 0374-4353.*

* cited by examiner

*Primary Examiner* — Philip Chea
(74) *Attorney, Agent, or Firm* — Hoffman Warnick LLC; Jean Sullivan (57) ABSTRACT

A method of creating an annotation to an email. The method includes: receiving an email; receiving a predefined user input; creating an annotation in response to the predefined user input, the annotation linked to the email; receiving a further user input; and defining a permission for the annotation according to the further user input, the permission defining user access to the annotation. When transmitting a second email as a response to the received email, the second email is linked to the annotation. The method further includes displaying at least a part of the annotation linked to the received email, for example when a user hovers over the email. The structure of the annotations allows the associating of the annotation with one or more further annotations.

12 Claims, 6 Drawing Sheets

EMAIL ANNOTATION

FIELD OF THE INVENTION

The present invention to a method and system for creating an annotation to an email.

BACKGROUND OF THE INVENTION

In the desktop computing environment, the use of email is ubiquitous. Almost every single computer user has at least one email address, which is accessed through an email client. The email client has a graphical user interface which shows received emails in an inbox. An individual inbox can receive lots of emails and, in this case, it is difficult for the individual to hold the status of each email in mind, especially when there is a high volume and there are other interruptions (such as in a busy office or at home); people returning to emails after a period of time away from them; or various people all using one shared inbox.

People can lose track of the status of certain emails and may have to seek ways of keeping a record of what they have done regarding particular emails, which may require writing down on a separate note, adding text to the email itself and then resending/saving, or orally updating others in a shared inbox, none of which are the most effective way to directly manage and easily keep a clear status of the email.

Currently, users of email clients can flag and categorize emails in the inbox as important, read/unread, or file them away. Alternative electronic methods of keeping track of work, which has already been done on a given email, include: maintaining a separate text file somewhere on the computer's file system, containing notes about progress made; and using separate annotation software to keep notes. However, all of these methods involve keeping notes outside of the email client, which makes it difficult to link different notes to different emails and deal with each individual email directly. The "follow up" feature in some email applications allows for an email to be returned to the user for future handling, with the facility to add one action only per email, and only one email per action is allowed. The format of the actions is restricted, so actions cannot be linked with other follow-up items or resources. There is no workflow management in the follow up feature beyond that of marking one email for one action with a date. The follow-up feature also can only be used to associate an action with an entire email, not with sections of the email text.

SUMMARY OF THE INVENTION

According to an aspect of the present invention, there is provided a method of creating an annotation to an email, comprising: receiving an email; receiving a predefined user input; creating an annotation in response to the predefined user input, the annotation linked to the email; receiving a further user input; and defining a permission for the annotation according to the further user input, the permission defining user access to the annotation.

According to another aspect of the present invention, there is provided a system for creating an annotation to an email, comprising: an email manager for receiving an email; an email user interface for receiving a predefined user input and a further user input; an annotation manager for creating an annotation in response to the predefined user input, the annotation linked to the email; and a permissions manager for defining a permission for the annotation according to the further user input, the permission defining user access to the annotation.

According to another aspect of the invention, there is provided a computer program product on a computer readable medium, which when executed, creates an annotation to an email, the program product comprising instructions for: receiving an email; receiving a predefined user input; creating an annotation in response to the predefined user input, the annotation linked to the email; receiving a further user input; and defining a permission for the annotation according to the further user input, the permission defining user access to the annotation.

Owing to the invention, it is possible to provide a method and system which allows a way of temporarily annotating individual emails with working notes, in order that a user can work on a particular email, return to it at a later date, and easily keep track of any work/ideas/comments/notes that they (or in a shared inbox, different users) have made to date. This infrastructure supports people in better managing their emails and improves the efficiency of the way people can respond to and work on emails and related tasks. The invention is designed to ease the way in which users view and use their inboxes to manage the ever increasing level of email, helping individuals to navigate, prioritize and track progress, status and delivery.

The proposed solution provides particular benefit in the context of shared inboxes, in addition to being a useful aid for busy people with busy inboxes and enables people to return to their emails at a later stage and clearly see the status and progress they have made on certain emails. The invention provides a solution to problems relating to email management, by providing embedded workflow management for email, using annotations. For example, a user may wish to annotate an email with different ideas they have had. They may wish to annotate it with notes about the different people they need to talk to before they respond to an email, or the people they have already made contact with.

Other things that could also be in annotations include, for example: links to other documents, a copy of an email sent from another inbox rather than copying it into other people's inboxes, and calendar entries. The annotation feature could allow rich format entries so that images and tables could also be included. Another dimension, such as color could be used to differentiate annotations by person, task or category, or to group notes by color according to what needs action, what is for reference and what are ideas etc. Annotations could be applied to any field in the email, including sender, title and signature, and the facility for associating that annotation with every instance of that title/sender/signature could be available or with particular email correspondence threads between a number of users.

In a shared inbox environment, where multiple users all work from the same inbox, users may wish to leave notes (containing references to other mail/resources/contacts, and not only 'actions') about the work they have done so far regarding an email, so that a different user can easily pick up where they left off without having to re-do much of the work that has already been done.

As an example of a method of creating an annotation, a user can right click on an email in their inbox, and annotate the email with various notes relevant to that particular email. The notes could then be viewed by, for example, hovering the mouse over the email and having the notes appear for the user to read. In addition they could be displayed in a separate section of the screen when an email is opened. The system can be configured so that the user interface displays at least a part of the annotation. The email annotations are designed to provide embedded tracking and status of to do items and actions, and also manage the linking of workflow with reference materials, rather than merely to make a comment.

Annotations can be directly associated with the top level email, or to internal sections of the email. Annotations could also be recursively attached to annotations, or to tags that exist in some mail services, or to collections of emails. In a system using tags, annotations could be tagged so that a user can find a specific one that is needed. For example, a user may tag certain annotations as 'ideas', indicating those that the user wishes to think about further. A user may have other annotations that are simply for reference, rather than an ongoing task. Color coding could be one way of distinguishing these. With this in place, a user can easily find those tasks that they need to perform and the related reference material with simple tag-based searching. Additionally, the system is an improvement to current tag-based systems since a user can directly embed links to reference documentation and other annotations in a single annotation without requiring tags to link them.

In a shared inbox environment, where multiple users access the same email inbox (perhaps as a team working on a project) each annotation can be associated to one or more users so that one person may assign an annotation to another, and any assigned annotations would be made immediately visible to the assignee on opening the inbox. Annotations can have an unread status in this instance to limit the numbers shown on startup. In this way, action delegation can be performed from one user to another.

At present, users are required to use other methods to track the work they have done on an email. For example, in a multi-user environment one user may have to email their co-workers to update them with the progress they have made, thus creating a second email that has to be referred to in order to continue work on the first one. If this process is repeated many times, it is easy for an inbox to become unnecessarily cluttered with emails all referring to the one initial mail. It is also more time consuming for the users involved and fundamentally inefficient. The provision of the annotations provides a solution that saves repetition, duplication and enables a greater interlock of ideas, knowledge, and collaboration.

The system could potentially be applied to other areas, for example the annotation of documents in other environments where embedded workflow would be useful, for example files in a code repository.

BRIEF DESCRIPTION OF THE DRAWINGS

Embodiments of the present invention will now be described, by way of example only, with reference to the accompanying drawings.

DETAILED DESCRIPTION OF THE INVENTION

Figure 1:
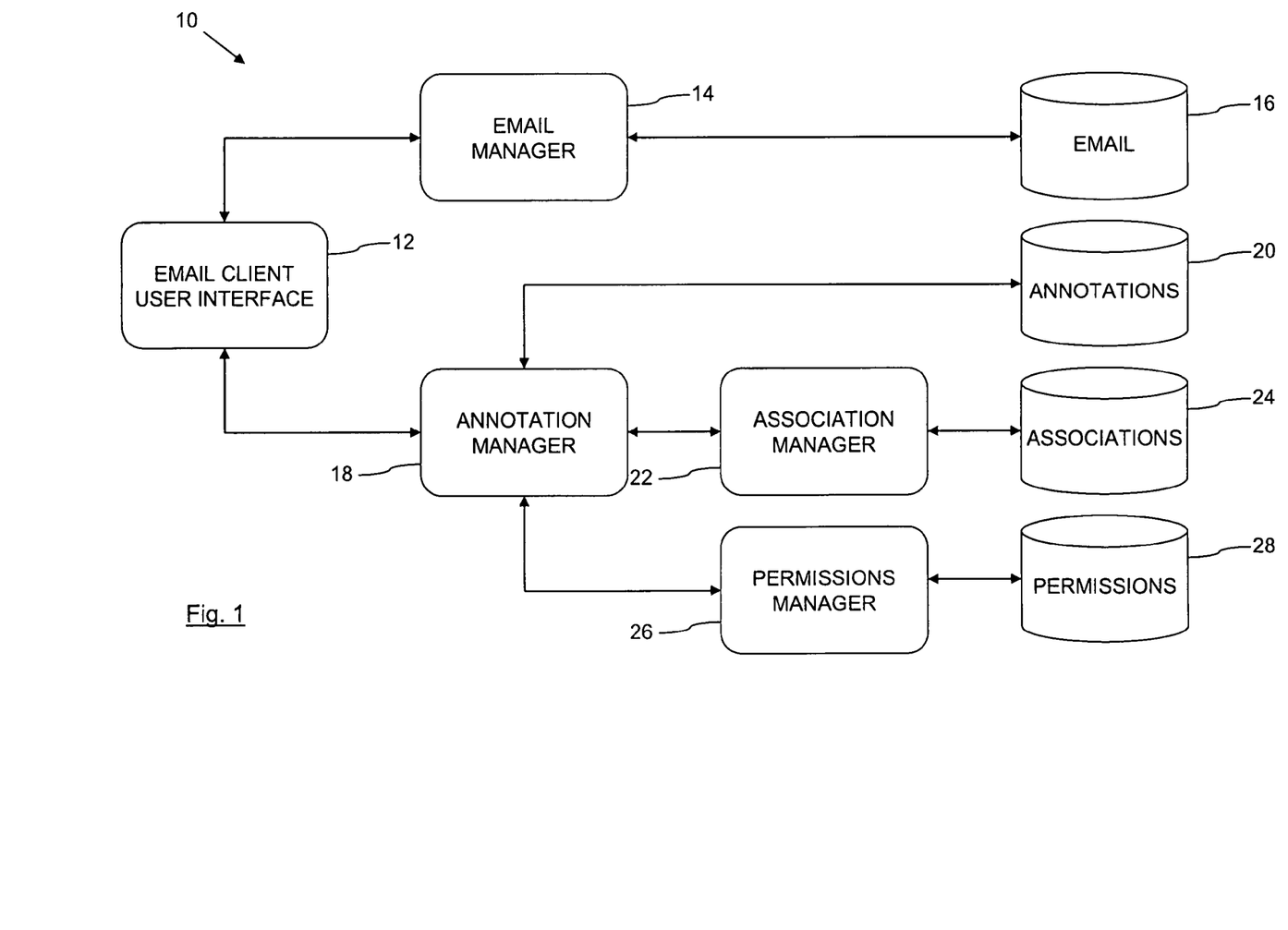
FIGS. 1 and 2 are schematic diagrams of a system for creating an annotation to an email in accordance with an embodiment of the present invention.

FIG. 1 shows schematically an email system 10. Email management is performed by an email client user interface 12, an email manager 14, and an email database 16. When annotation information for a specific email is required, for example when a user selects an email by hovering over an email, then the user interface 12 requests any associated annotations for the email from an annotation manager 18, providing an email ID and an ID for the current user.

The annotation manager 18 passes the email ID to an association manager 22, which retrieves the IDs for any associated annotations stored in association database 24. The annotation manager 18 then passes the user ID and annotation IDs to a permission manager 26, which retrieves the permissions for the current user for each annotation from the permission database 28. For every annotation that the user has permission to read, the annotation manager 18 retrieves the annotation details (the content) from the annotation database 20.

The annotation manager 18 also passes the annotation ID to the association manager 22 which retrieves any associated email or annotation IDs from the association database 24 (as the annotation may be associated with other emails and annotations). The annotation manager 18 then returns the list of annotations with their associated details, permissions, and linked annotations and emails to the user interface 12, which then displays at least a portion of the associated annotation linked to the selected email.

This scenario only covers annotations linked to entire emails. If sections within emails are associated to an annotation, then the user interface 12 would still pass the email ID but the annotation manager 18 would return an ID representing the particular section of the requested email for each annotation (in a format understood and originally specified by the user interface 12 when the association was created).

Figure 2:
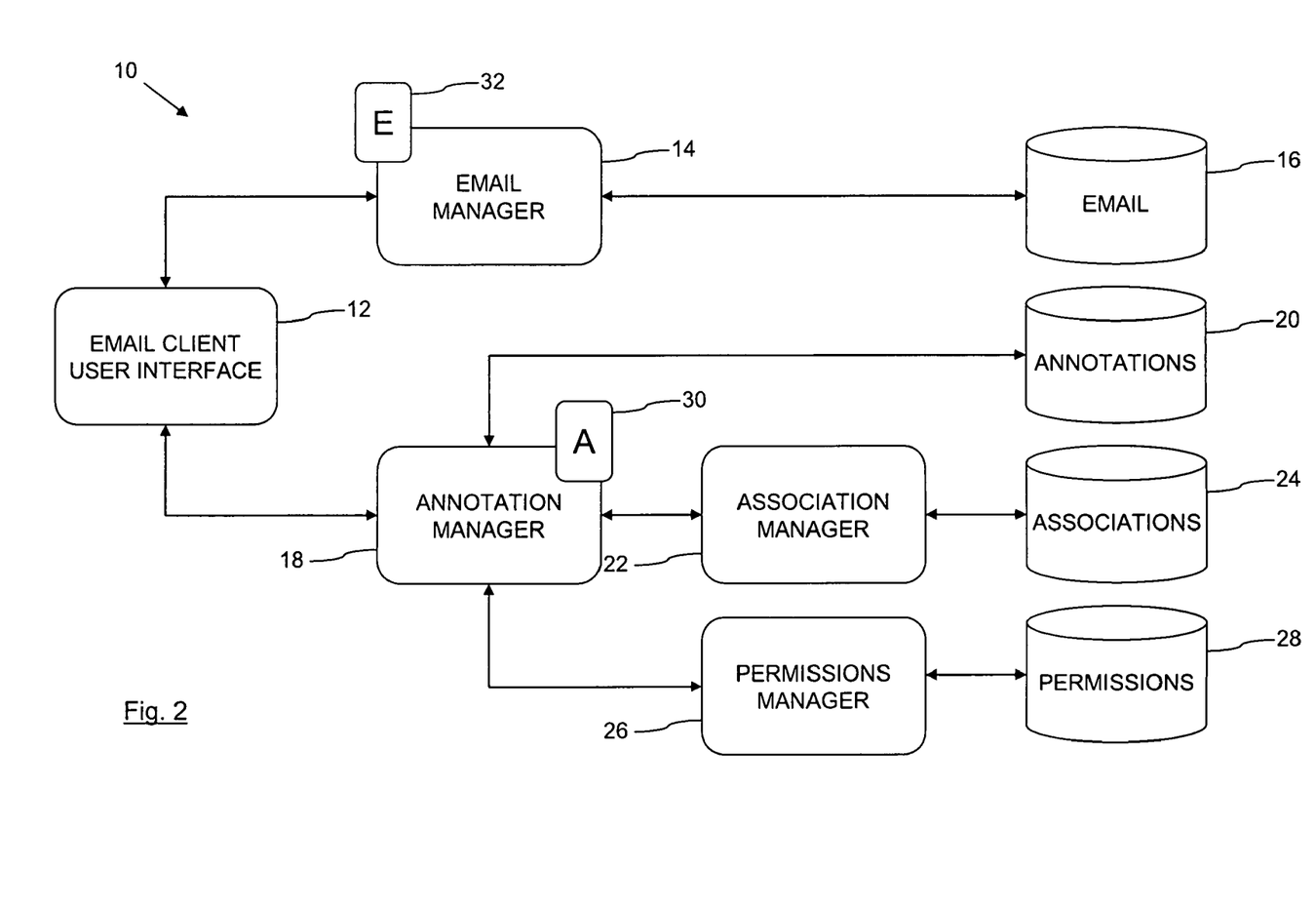

The above discussion with reference to FIG. 1, assumes that an annotation is already in existence. FIG. 2 illustrates how the system 10 operates when a new annotation 30 is created for a newly received email 32. The email manager 14 is arranged to receive the email 32. A user is then viewing the email 32 in an inbox shown as part of the user interface 12. The user interface 12 is arranged to receive a predefined user input, which may be a right-click on the email 32 and then a selection of "create new annotation" from a drop-down menu that has been pulled down by the user action of the right-click. The annotation manager 18 is then arranged to create the annotation 30 in response to the predefined user input, the annotation 30 linked to the email 32 (via a suitable ID scheme, for example). The user interface 12 is arranged to receive a further user input, and the permissions manager 26 is arranged to define a permission for the annotation 30 according to the further user input, the permission defining user access to the annotation 30. The two simplest permissions are, firstly that only the user who created the annotation 30 can view the annotation 30, and secondly that all interested users can view the annotation 30.

If the email inbox that the user is currently accessing is a shared inbox, then the creation of an annotation 30 by a user with an open permission, will allow the other users of the inbox to see that annotation 30. This is particularly useful, for example, if the original email 32 has one or more queries within it. A first user accessing that email can create an annotation 30 which states, for example, that that user is attending to the query(-ies). Other users of the shared inbox will then see the annotation 30, when they access the inbox. The permission associated with the annotation 30 can include detail in relation to read and write permission, for example, allowing other users to view the annotation 30, but not to amend it.

Figure 3:
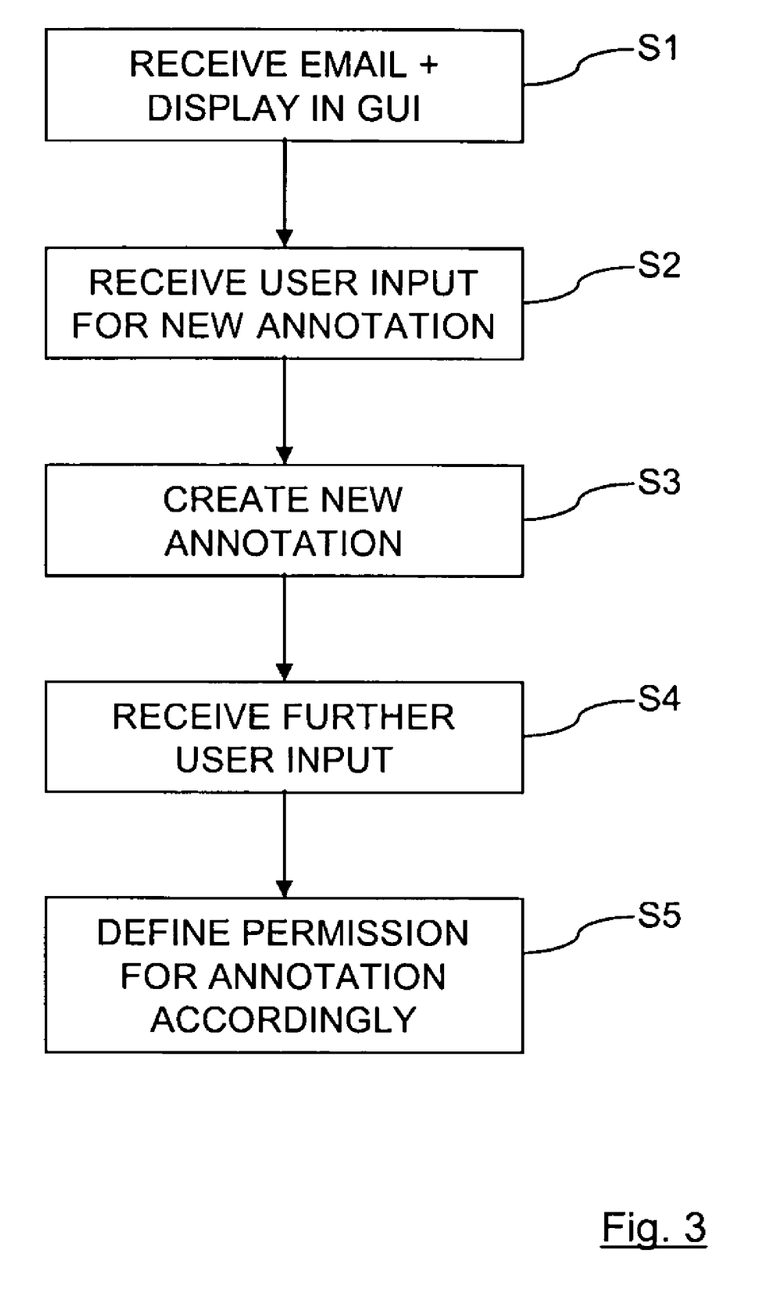
FIG. 3 is a flowchart of a method of creating an annotation in accordance with an embodiment of the present invention.

FIG. 3 summarizes the methodology of the creation of the annotation 30. The process of creating the annotation 30 to the email 32 comprises, step S1, receiving the email (which is displayed to the user), step S2, receiving a predefined user input, step S3, creating the annotation 30 in response to the predefined user input, the annotation 30 linked to the email 32, step S4, receiving a further user input, and ultimately, step S5, defining a permission for the annotation 30 according to the further user input, the permission defining user access to the annotation 30.

Figure 4:
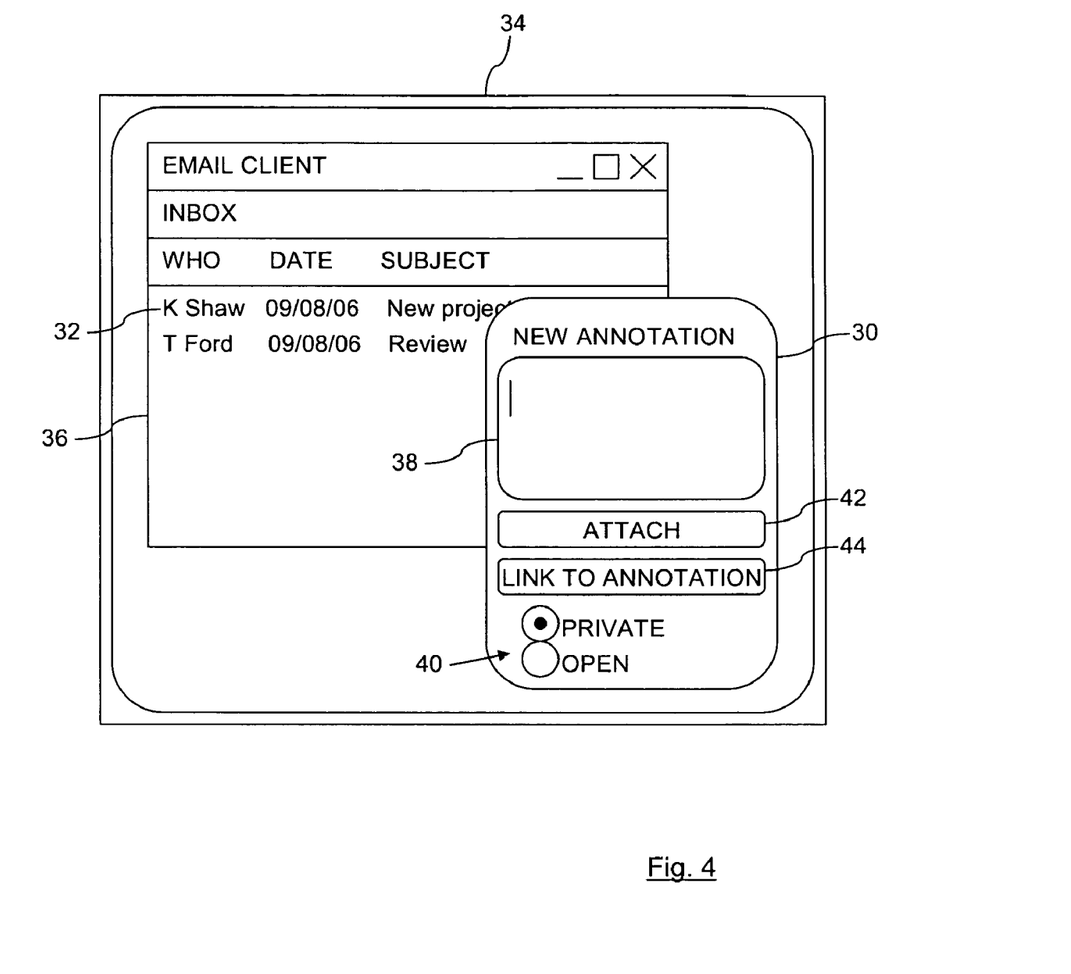
FIGS. 4 and 5 are schematic diagrams of a display portion of a user interface in accordance with an embodiment of the present invention.

FIG. 4 shows an example of how a user's inbox might look, at the point when the user has made the predefined user input to indicate that they wish to create a new annotation 30. In the example of FIG. 4, a display device 34 is showing an email client 36, which is part of the email user interface 12 of FIGS. 1 and 2. The user has right-clicked on the received email from "K Shaw", and selected the option to create a new annotation 30. This new annotation 30 is linked automatically to the email 32 from which it stems.

The annotation 30 has a text field 38 which allows the user to add suitable text. Also shown is the permission field 40, which allows the user to choose between a private and open permission for the annotation 30. For illustration purposes, this is kept simple, but a practical embodiment will have additional options for the permission field 40, including the option of a custom permission that allows a detailed setting of the read and write status of the newly created annotation 30.

The annotation 30 shown in FIG. 4 also has an attachment button 42 and a link to annotation button 44. The attachment button 42 allows the user to create links to resources that already exist, such as links to external and internal web pages on the Internet or an Intranet, or to specific files on a file system, via an address. The link to annotation button 44 allows the user to specify one or more already existing annotations to which this new annotation 30 is linked. This supports the user in monitoring workflow and managing the jobs that they have to do. For example, this email has the subject field "New project", and the user may be maintaining an overarching annotation that relates to all their current projects. This new annotation 30 can be linked to this overarching annotation.

OTHER EXAMPLES

Example 1

An Individual's Inbox.

A person has five minutes to check emails before a meeting. They read their emails and can jot down some initial ideas/things to action in the annotated note 30. When they return they can clearly see what actions need to be taken or any ideas/comments they had regarding the emails. They can then use the annotation system to record the progress of these actions, for example "I have phoned Mr xxx regarding yyy and am waiting on zzz". The person then plans to take a longer period of time and writes some notes for each email left. When they return they can clearly see the status of each email as they left it, what progress has already been made and what needs to be done.

Example 2

Individual Annotation in a Shared Inbox.

A user of a shared inbox annotates an email in a shared inbox and marks part of the annotation 'public' and part of it 'private'. For example, the public part of the annotation 30 reads: "Please deal with this while I am away, I have not made this call", and the private part of the annotation 30 reads: "Need to check the annotations on this mail when I get back, in case no one has dealt with it".

Example 3

Collaboration in a Shared Inbox.

An email arrives in a shared inbox (shared by X, Y and Z). X creates an annotation 30 in regards to how it relates to some other work currently being done by X, possibly with a link for more info, and the contact names, but wants Y to work on the email. Y then knows who to contact and annotates email that Y has contacted xxx and is waiting on xxx before a response can be given to the email. P then phones Z, when neither X or Y are in the office, and asks about the status of the email. Z is able to easily see the annotation 30 and communicates with P and tells them that work has been done and what they are waiting on before they progress.

There are various ways in which the system of annotations could be implemented. The system could use similar code used for creating text bubbles/floating abstracts which float on an underlying element, for example, when the mouse hovers over them, but this would be different as it is a system where the user can add/edit/create a working note, which could be attached to each email. The annotations could be stored as notes as additional meta-data with the relevant email, or could alternatively or additionally be stored as notes as a separate file on the local machine, that is linked by the email client to each email. In each of these cases, every time an email is opened, or the user hovers the mouse over an email, the separate notes file is read and the data from it displayed on screen.

In a shared inbox environment, security could be implemented so that a user could store annotations that were either public to all users or private for their own information only. Also, certain references to other emails, documents or annotations may not be accessible by certain users and hence would be automatically hidden from view so that a user only sees information that is appropriate.

Figure 5:
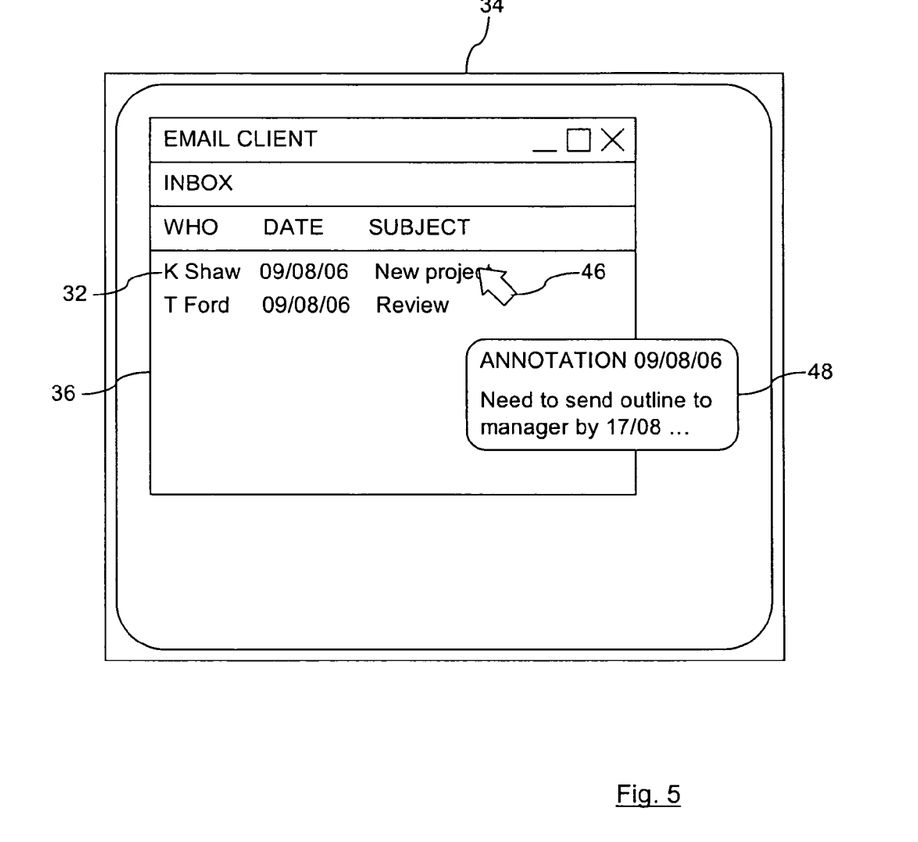

Viewing annotations can be done in a variety of ways. An example is shown in FIG. 5, when a user hovers the cursor 46 over a list of emails, the user sees a pop-up bubble 48 of the annotation 30 associated with the email 32 which is currently under the cursor 46. Multiple annotations 30 can be present for a specific email 32, and bubbles for all of the linked annotations will be shown to the user. The user can click on the bubble 48 to access the entire annotation 30, which they can then amend or update as they see fit. If the user were to reply or forward the email 32 to one or more other users, then the link to the annotation is maintained in the new email, assuming that the appropriate permission was original set, when the annotation 30 was created.

Also when viewing a list of emails the user may wish to either show that certain emails have annotations using a visible icon or indeed show the text itself separately, for example as a preview pane within the email client. Either all annotations or only those associated with the entire email rather than with particular sections could be shown. When viewing a single email, annotations could pop-up in the appropriate locations and a separate section for those associated with the entire email, or all could be shown in a separate view pane.

Figure 6:
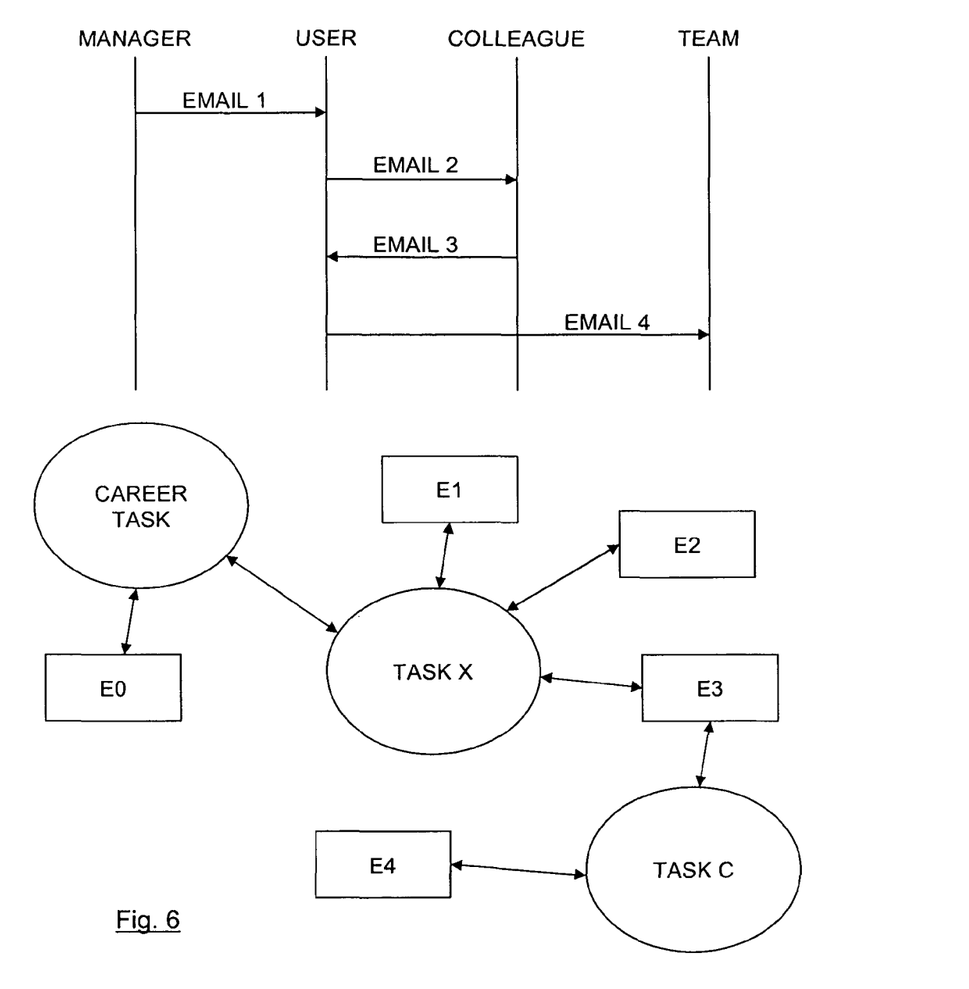
FIG. 6 is a schematic diagram illustrating email traffic and the relationships between emails and annotations in accordance with an embodiment of the present invention.

The system of annotations supports a complex linking of the components of emails 32 and annotations 30. The following scenario, with reference to FIG. 6 outlines how this invention might work in such a complex scenario. In FIG. 6, the top half shows the message flow of emails between various different people, and the bottom half shows the linking of components, with annotations shown as circles (tasks) and the emails shown as rectangles (En)

A manager sends a user email 1 which is asking the user to carry out task X. This task X can be divided into two tasks A and B where B is a career related task. The user creates annotation TASKX and associates it with the email 1. The user also associates email 1 and the annotation TASKX with an existing annotation CAREERTASK. Without this invention a user could use a conventional follow-up functionality to add an action to email 1 but both actions cannot be tracked separately. The follow-up function could not be used to associate email 1 with an existing action as emails have a 1:1 relationship with follow-up actions.

The user then sends email 2 to a colleague, in which they are delegating task A, associating email 2 with TASKX and updating TASKX to show that A is in progress but delegated to the colleague. Had the user used a tagging system to associate email 1 with multiple tags, the user would have had nowhere to store and track the status of task A. The colleague sends email 3, replying to email 2, back to the user asking for clarification on task A but also asks whether the user has completed task C from last week. Email 3 is automatically associated with TASKX as it is part of the same email thread as email 2. The annotation system allows the user to keep track of the status of two separate workflows associated with the same email.

The user updates TASKX to remind himself to meet the colleague to discuss task A. Then the user manually associates email 3 with the existing annotation TASKC and forwards email 3 to his team asking for status (hence creating email 4) and updating TASKX to show that task A has been completed. Email 4 is automatically associated with TASKC as it is part of the same mail thread as email 3. When the team replies, each email is automatically associated to the single annotation TASKC and the user can easily check status at a later date without needing to locate each individual email in their inbox. Without this innovative annotation system, this could only be observed by opening each email or associating the status with a single email or stored in another location.

The user then meets the colleague for coffee and discovers that clarification was not needed, and task A has actually been completed. The user updates the annotation TASKX when they get back to their desk to show the completed status of task A. At a later date when questioned by auditors as to whether the user completed task A, they are able to tell them that they delegated the task to a colleague and its completion was verbally confirmed. To prove this it is possible to open annotation TASKX and show the associated email 2 and annotation comments regarding its completion. Had the user edited email 2 to write in their own comment to show task A was complete, this would not have preserved the integrity of the original communication and with this system of annotations it is possible to have a complete workflow of the entire task and other related tasks.

While looking at annotation TASKX the user reviews the status of all related tasks. The user can see at a glance that they now only have to complete task B. To do this they need to refer to email 0 from their mentor received some months ago and associated with annotation CAREERTASK. As annotation TASKX is associated with annotation CAREERTASK, the associated email 0 is immediately at the user's fingertips. Once task B is completed the user can update TASKX and in doing so, immediately observe that tasks A, B and hence X are completed. The user can complete the workflow by sending an email to the manager informing of task X completion and associate this with TASKX.

From this scenario, it is possible to see the following advantages of the system. There is a single storage location: a task embodied as an annotation has a single point where related resources can be accessed. Multiple start points: the information about a task can be accessed directly from any associated resource. Independence: annotations are stored and may be accessed independently from emails. Automatic association: annotations may be automatically associated with emails. Integrity: emails are not modified in any way. Multiple associations: many to many relationship between components/resources (emails and annotations). Annotation association: annotations may be associated with other annotations, not just emails. Quick reference: it is immediately obvious which resources are associated with one another. Verbal records: verbal communication records now have a common storage location with written forms. Workflow: tasks may be entirely managed from start to finish in one location, even when resources are associated with other tasks. Provenance: audit trails are maintained by linking emails together with workflow comments. Dynamic structure: no prior manual organization is required, for example creating folders for filing documents. No rigid topology: structure is formed through association rather than hierarchy and the topology need not be known. Multiple users: usage in a shared inbox for sharing annotations has key productivity implications. Multiple resource types: associations could also be applied to other resources, for example, documents in a team room.

The foregoing description of the embodiments of this invention has been presented for purposes of illustration and description. It is not intended to be exhaustive or to limit the invention to the precise form disclosed, and obviously, many modifications and variations are possible.

The invention claimed is:

1. A method of creating an annotation to an email communication, comprising:
   receiving a first email including a first annotation;
   receiving a predefined user input;
   creating a second annotation in response to the predefined user input, the second annotation linked to the first email;
   receiving a further user input;
   defining a permission for the second annotation according to the further user input, the permission defining user access to the second annotation, wherein the permission defines user access for a specific user to only a sub-portion of the second annotation;
   transmitting a second email, the second email separately composed and distinct from the received first email, as a response to the received first email; and
   linking the second email to the second annotation and not the first annotation.

2. The method according to claim 1, further comprising:
   displaying at least a part of the second annotation linked to the received first email.

3. The method according to claim 1, further comprising:
   associating the second annotation with at least one additional annotation.

4. The method according to claim 1, wherein the predefined user input includes a reference to a section of the first email, and when creating the second annotation in response to the predefined user input, the second annotation is linked to the section within the first email.

5. A system for creating an annotation to an email communication, comprising:
   at least one computing device, including:

an email manager for receiving a first email including a first annotation;

an email user interface for receiving a predefined user input and a further user input;

an annotation manager for creating a second annotation in response to the predefined user input, the second annotation linked to the first email;

a permissions manager for defining a permission for the second annotation according to the further user input, the permission defining user access to the second annotation, wherein the permission defines user access for a specific user to only a sub-portion of the second annotation;

wherein the email manager is arranged to transmit a second email, the second email separately composed and distinct from the received first email, as a response to the received first email, and the annotation manager is arranged to link the second email to the second annotation and not the first annotation.

6. The system according to claim 5, wherein the user interface is arranged to display at least a part of the second annotation linked to the received first email.

7. The system according to claim 5, further comprising:

an association manager arranged to associate the second annotation with one or more further annotations.

8. The system according to claim 5, wherein the predefined user input includes a reference to a section of the first email, and the annotation manager is arranged, when creating the second annotation in response to the predefined user input, to link the second annotation to the section within the first email.

9. A computer program product on a non-transitory computer readable medium, which when executed, creates an annotation to an email communication, the program product comprising instructions for:

receiving a first email including a first annotation;

receiving a predefined user input;

creating a second annotation in response to the predefined user input, the second annotation linked to the first email;

receiving a further user input;

defining a permission for the second annotation according to the further user input, the permission defining user access to the second annotation, wherein the permission defines user access for a specific user to only a sub-portion of the second annotation;

transmitting a second email, the second email separately composed and distinct from the received first email, as a response to the received first email; and linking the second email to the second annotation and not the first annotation.

10. The computer program product according to claim 9, further comprising instructions for:

displaying at least a part of the second annotation linked to the received first email.

11. The computer program product according to claim 9, further comprising instructions for:

associating the second annotation with one or more further annotations.

12. The computer program product according to claim 9, wherein the predefined user input includes a reference to a section of the first email, and when creating the second annotation in response to the predefined user input, the second annotation is linked to the section within the first email.

* * * * *